WALTER S. DRUZ
INVENTOR.
BY John J. Pederson
HIS ATTORNEY.

INVENTOR.
WALTER S. DRUZ
BY John J. Pederson
HIS ATTORNEY.

WALTER S. DRUZ
INVENTOR.

BY John J. Pederson
HIS ATTORNEY.

2,916,543
Patented Dec. 8, 1959

2,916,543

SECRECY COMMUNICATION SYSTEM

Walter S. Druz, Bensenville, Ill., assignor to Zenith Radio Corporation, a corporation of Delaware Application May 29, 1956, Serial No. 587,984
11 Claims. (Cl. 178—5.1)

This invention relates to a secrecy communication system in which an intelligence signal is transmitted in coded form to be utilized only in receivers equipped with decoding apparatus controlled in accordance with the coding schedule employed at the transmitter. Since the invention may be practiced in either the transmitter or receiver, the term "encoding" is used herein in its generic sense to encompass either coding at the transmitter or decoding at the receiver.

In certain previous secrecy communication systems, an intelligence signal is coded in accordance with a periodically varying characteristic, such as amplitude, of a control signal; the operating mode of the intelligence signal is changed with each characteristic variation. In order to increase the coding or scrambling complexity of the coded intelligence, the periodic pattern of the control signal is interrupted or disrupted from time to time during spaced mode-determining intervals in accordance with a secret code schedule so that the phase of the control signal is changed from one to another of the intervening time intervals as between several possible phase conditions. One such prior system is shown, for example, in copending application Serial No. 479,170, filed December 31, 1954, in the name of Erwin M. Roschke, and assigned to the present assignee.

In that system, which takes the form of a subscription television system, a cyclic counting mechanism, comprising a 5:1 blocking oscillator and two bi-stable multivibrators, is actuated in response to line-drive pulses to develop a square wave control signal having amplitude changes after each series of ten line-trace intervals. This control signal is employed to effect mode changes in the video portion of the transmitter by periodically, namely every ten line traces, introducing or removing a time delay of the video with respect to the line-synchronizing components.

During a portion of each field-retrace interval, which is called a "mode-determining interval," a combination of randomly sequenced code signal bursts, individually having a predetermined identifying frequency, is developed; by means of an adjustable switching or transposition mechanism, these various bursts are segregated from one another and utilized to supply actuating pulses to selected input circuits of the two bi-stable multivibrators in the counting mechanism. The application of these actuating pulses to the counter is determined by the adjustment of the switching mechanism, which is made known only to authorized subscribers. With this arrangement, the pulses selectively trigger the bi-stable multivibrators in a prescribed random or irregular sequence imposed by the code bursts to disrupt or interrupt the normal cyclic actuation of the counting mechanism during the mode-determining or field-retrace intervals in accordance with a secret code pattern and re-phase the square wave control signal developed thereby to a selected one of several, specifically twenty, possible phase conditions. Consequently, the control signal produced in the counting mechanism and used for changing modes exhibits periodic amplitude variations during the field-trace intervals, due to the cyclic operation of the counting mechanism, and random variations, during the mode-determining or field-retrace intervals, due to the action of the code bursts.

Each such combination of code signal bursts is transmitted to subscriber receivers along with the composite video signal during the field-retrace interval in which it occurs in order to permit a similar decoding arrangement to be controlled in precisely the same manner as the coding mechanism at the transmitter.

The identical control signal may also be used in the Roschke system, Serial No. 479,170, to code the audio components of the television signal by, for example, inverting the phase of the audio signal each time the control signal undergoes an amplitude change. Very effective audio coding is achieved in this way and the audio portion of a coded telecast is rendered completely unintelligible.

However, inasmuch as the control signal contains random amplitude variations during the mode-determining or field-retrace intervals, which indirectly reflect or indicate the secret code pattern represented by the code bursts, the corresponding phase inversions of the audio signal likewise reflect the code pattern. Consequently, it may be remotely possible, with the use of complex and expensive electronic equipment, for an unscrupulous person bent on fraud to correlate the audio "telltale" phase inversions during field retrace with the code bursts in order to decipher or unscramble the telecast.

The present invention is calculated to improve the secrecy aspects of such a prior system in order to decrease further, if not completely eliminate, any remote possibility of unauthorized pirating of the subscription telecast.

It is, accordingly, an object of the present invention to provide a new and improved secrecy communication system of the type disclosed in the copending Roschke application, Serial No. 479,170.

It is another object of the invention to provide a new and improved secrecy communication system in which an intelligence signal is coded with a high degree of complexity and yet is completely immune from unauthorized appropriation.

It is still another object of the invention to provide an improved subscription television system, of the type employing an air-borne coding signal, in which coding is achieved in such a manner that unauthorized decoding is virtually eliminated.

It is a further object of the invention to provide a secrecy communication system for utilizing a control signal for coding an intelligence signal in accordance with a secret code pattern, where the control signal exhibits "telltale" characteristic variations reflecting that code pattern, without providing or introducing any clues in the coded intelligence which would give away the code pattern.

A secrecy communication system, constructed in accordance with the invention, translates an intelligence signal selectively in a plurality of different operating modes. The system comprises a control mechanism having a plurality of operating conditions and means for cyclically actuating this control mechanism between its operating conditions to develop a control signal having a characteristic that varies periodically in accordance with a predetermined mode-changing pattern. Means is provided for disrupting the cyclic actuation of the control mechanism during each of a series of spaced intervals in accordance with a predetermined code pattern to vary the phase of the control signal from one to another of the time intervals intervening the spaced intervals, thereby introducing during each at the spaced intervals additional variations of the characteristic indicative of at least a portion of the code pattern. The communication system has means for developing an intelligence signal and also encoding means coupled to the control mechanism and to the intelligence-signal-developing means for utilizing the control signal to effectively encode the intelligence signal. Finally, there are means coupled to the encoding means for preventing encoding of the intelligence signal during the spaced intervals, thereby restricting encoding to the intervening time intervals only.

The features of this invention which are believed to be new are set forth with particularity in the appended claims. The invention, together with further objects and advantages thereof, may best be understood, however, by reference to the following description in conjunction with the accompanying drawings, in which:

Figure 1:
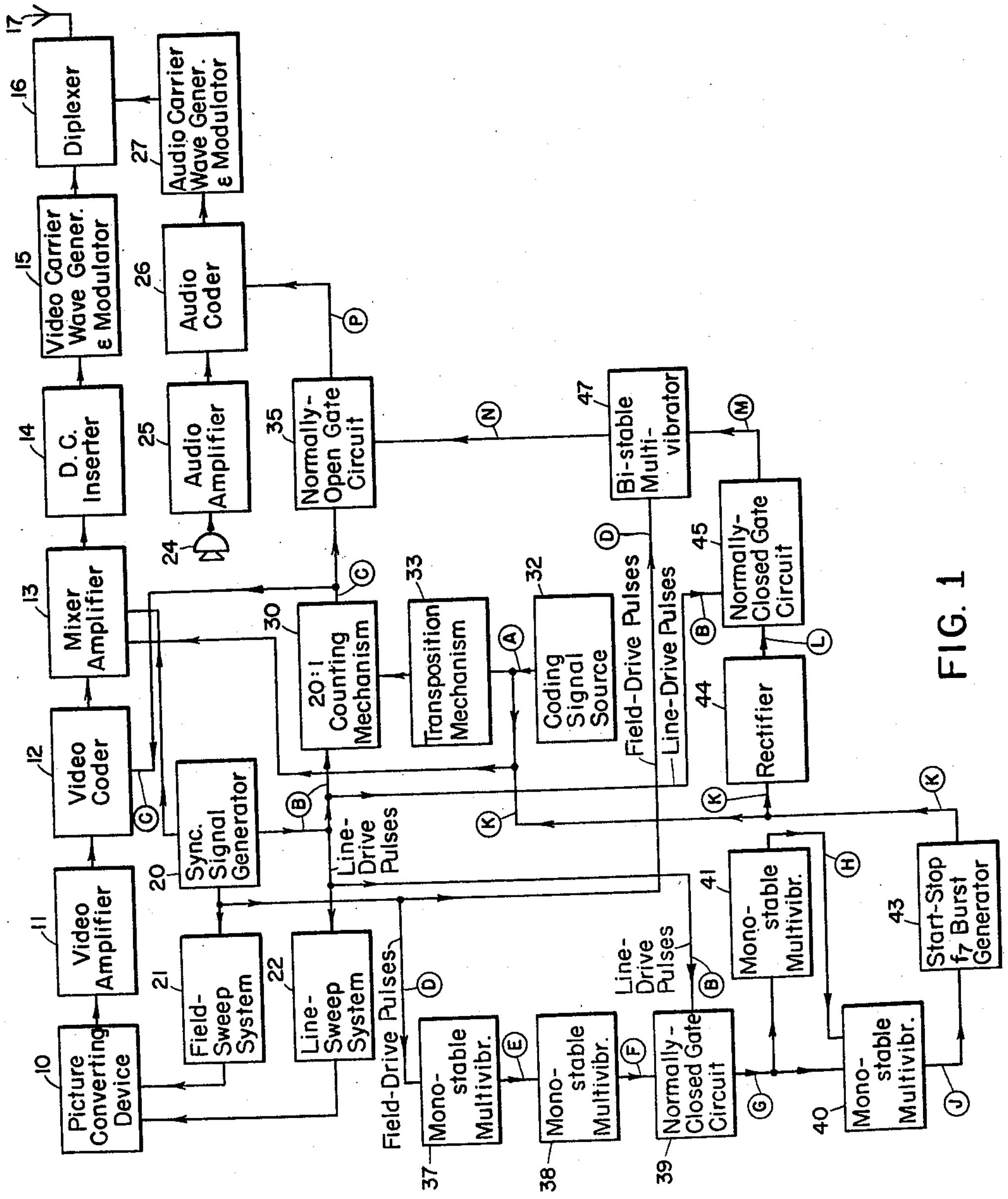
Figure 1 is a schematic representation of a subscription television transmitter constructed in accordance with the invention.

The transmitter of Figure 1 includes a picture-converting or pick-up device 10 which may be of any well known construction for deriving a video signal representing the image to be televised. The output terminals of device 10 are connected through a video amplifier 11 and a video coder 12 to one pair of input terminals of a mixer amplifier 13. Video coder 12 may be similar to that disclosed and claimed in copending application Serial No. 243,039, filed August 22, 1951, and issued Aug. 7, 1956 as Patent 2,758,153, in the name of Robert Adler, and assigned to the present assignee. Coder 12 may comprise a beam-deflection tube having a pair of output circuits which may be selectively coupled into the video channel as the electron beam of the tube is deflected from one to the other of two beam-receiving anodes coupled to such output circuits. One of these circuits includes a time-delay network so that the timing of the video components relative to the synchronizing components of the radiated signal varies as the beam of the deflection tube is switched between its anodes. This switching effect is accomplished by means of a beam deflection-control or actuating signal applied to a pair of deflection electrodes of video coder 12, as explained hereinafter. The introduction of such intermittent variations in the relative timing of the video and synchronizing components effectively codes the picture information since conventional television receivers, not equipped with suitable video decoding apparatus, depend upon an invariant time relation of the video and synchronizing components of a received signal to reproduce the image intelligence represented thereby.

Mixer amplifier 13 is coupled through a direct-current inserter 14 to a video carrier-wave generator and modulator 15 which, in turn, is connected through a diplexer 16 to an antenna 17. The transmitter also includes a synchronizing-signal generator 20 which supplies the usual field- and line-synchronizing components and associated pedestal components to mixer 13. Generator 20 further supplies field- and line-drive pulses to a field-sweep system 21 and to a line-sweep system 22, respectively. The output terminals of sweep systems 21 and 22 are connected respectively to the field- and line-deflection elements (not shown) associated with picture-converting device 10.

A microphone 24 is connected through an audio amplifier 25 to the input terminals of an encoding device in the form of an audio coder 26. This coder may be similar to that which is disclosed in copending applications Serial No. 366,727, filed July 8, 1953, and issued September 16, 1958 as Patent 2,852,598, in the name of Erwin M. Roschke; and Serial No. 587,600, filed May 28, 1956, in the name of Walter S. Druz, both of which are assigned to the present assignee, and may comprise a beam-deflection tube having a control grid modulated in accordance with audio intelligence and a pair of beam-receiving anodes connected to opposite terminals of a primary winding of an output transformer. A rectangular-wave control signal is applied to the deflection electrodes of the tube, as explained hereinafter, in order to direct the beam in alternation to the two anodes. With this arrangement, the phase of the audio signal is effectively inverted at the secondary winding of the transformer each time the beam switches from one anode to the other, and this occurs each time there is an amplitude variation of the control signal. The output terminals of encoding device 26 are connected through an audio carrier-wave generator modulator 27 to another input circuit of diplexer 16.

Synchronizing-signal generator 20 additionally supplies line-drive pulses to a 20:1 control or counting mechanism 30 having twenty operating-steps or conditions and which may comprise a conventional 5:1 step down blocking oscillator and two conventional bi-stable multivibrators, all three circuits connected in cascade, in order to exhibit a total 20:1 division rate with respect to the line-drive pulses applied to the input terminals and consequently to develop a square wave control signal having amplitude variations occurring after every 10 line-trace intervals. A similar counting arrangement is shown in the copending Roschke application, Serial No. 479,170. The output terminals of control mechanism 30 are connected to the deflection elements of video coder 12 to supply a deflection-control signal thereto in order to effect actuation of coder 12 between its two operating conditions and code the video components of the television signal in accordance with a code schedule represented by the amplitude changes or excursions of the control signal.

A coding signal source 32 is provided which may comprise a code signal generator containing a series of six individual signal generators for developing during each mode-determining or field-retrace interval a combination of code signal components or bursts each of which has a predetermined identifying characteristic such as frequency and collectively determining a code pattern in accordance with their appearance and order within the combination. Suitable code signal generators of this type are fully disclosed and claimed in copending applications Serial No. 463,702, filed October 21, 1954, in the name of Carl G. Eilers et al.; and Serial No. 486,135, filed February 4, 1955, and issued November 25, 1958 as Patent 2,862,149 in the name of Jack E. Bridges, both of which are assigned to the present assignee. The output terminals of code generator 32 are connected to mixer 13 in order to add the code bursts to the composite video signal for concurrent radiation therewith.

Coding signal source 32 is connected to counting mechanism 30 through a transposition or switching mechanism 33. Actually for the air-borne coding information to be itself coded, it must distinguish from the code information applied to counter 30. For that purpose, it will be assumed that transposition mechanism 33 includes a multi-element switching arrangement from which the coding information or bursts of six various signal frequencies are selectively taken for delivery to counter 30. And it will be further assumed that the several outputs of the transposition mechanism connect to the two multivibrators of control mechanism 30 in the manner shown in detail in the copending Roschke application, Serial No. 479,170, in order that the cyclic count may be interrupted in each field-retrace interval to increase the coding complexity. Suitable transposition mechanisms that provide adequate degrees of security against unauthorized deciphering are disclosed and claimed in, for example, copending applications Serial No. 407,192, filed February 1, 1954, and issued December 30, 1958 as Patent 2,866,961, in the name of George V. Morris; Serial No. 419,301, filed March 29, 1954, and issued August 19, 1958 as Patent 2,847,768, in the name of Jack E. Bridges; Serial No. 490,078, filed February 23, 1955, in the name of George V. Morris et al; and Serial No. 555,541, filed December 27, 1955, in the name of Jack E. Bridges, all of which are assigned to the present assignee.

The control signal developed in the output of control mechanism 30 undergoes amplitude changes during the mode-determining or field-retrace intervals because of the effect of the code bursts from generator 32. Such amplitude variations do have a relationship or correlation with the particular instantaneous adjustment of transposition mechanism 33 and for that reason it is desired that such amplitude changes during field retrace be kept secret. If the control signal were supplied directly to the audio coder to phase invert the audio signal with each amplitude change, the coded audio signal would then contain "telltale" phase inversions which would correspond to those amplitude variations during field retrace, thus giving away the code pattern. Of course, no such problem is presented with respect to video coding since, although the control signal supplied to video coder 12 does exhibit amplitude variations during field-retrace which have a relationship to the setting of switching mechanism 33, there is no video information occurring during these retrace intervals and consequently an examination of the coded video would reveal absolutely no coding information.

In accordance with the present invention, the same control signal used for coding the video information is also used for coding the audio signal, but the "telltale" amplitude variations during field-retrace are effectively removed or deleted from the control signal before application to audio coder 26. A normally-open gate circuit 35 is provided for this purpose and is coupled between the output of control mechanism 30 and another input of audio coder 26; specifically gate 35 is connected to the beam-deflection electrodes of the coder.

In order to actuate or close gate circuit 35 during each field-retrace interval, or at least during the mode-determining portion of each such interval in which the coding bursts occur, a pair of additional start-stop code bursts, which embrace the code bursts from source 32, are developed and are utilized to produce the proper gating signal for gate circuit 35. Specifically, a mono-stable multivibrator 37 is coupled to synchronizing-signal generator 20 to receive field-drive pulses therefrom and the output of multivibrator 37 is connected through another mono-stable multivibrator 38 to one pair of input terminals of a normally-closed gate circuit 39. Gate 39 has another input circuit connected to generator 20 to receive line-drive pulses, and the output terminals are connected to one pair of input terminals of a mono-stable multivibrator 40 and also the input circuit of another mono-stable multivibrator 41. The output of multivibrator 41 is connected to another input circuit of multivibrator 40, and the output terminals of this latter multivibrator are connected to a start-stop burst generator 43. In copending applications Serial No. 463,702 and Serial No. 486,135, the coding bursts exhibit any one of six various frequencies designated $f_1$–$f_6$; the start-stop bursts are of a still different frequency designated $f_7$.

The output of generator 43 is connected directly to mixer amplifier 13 and through a rectifier 44 to a pair of input terminals of a normally-closed gate circuit 45 which has another pair of input terminals connected to synchronizing-signal generator 20 to receive line-drive pulses therefrom. The output of gate circuit 45 is connected to the triggering input circuit of a bi-stable multivibrator 47 so that the multivibrator is actuated from its instantaneous operating condition, whichever that may be, to its alternate operating condition in response to each applied pulse from gate circuit 45. A reset input circuit of multivibrator 47 is connected to synchronizing-signal generator 20 to receive field-drive pulses in order that the multivibrator may be reset to a predetermined reference operating condition in response to each field-drive pulse. The output terminals of bi-stable multivibrator 47 are connected to another input circuit of gate circuit 35 in order to provide an actuating signal therefor to effectively remove the amplitude variations of the control signal during the mode-determining portion of each field-retrace interval. This in effect restricts the actuation of audio coder 26 to the time intervals, primarily the field-trace intervals, intervening the mode-determining intervals.

In order to simplify the detailed explanation of the operation of the transmitter of Figure 1, consideration will initially be given to the operation without regard to the effect of the coding circuitry. Picture converter 10 develops a video signal which represents the picture or image information to be televised. This signal is amplified in video amplifier 11, translated through video coder 12, and applied to mixer amplifier 13 wherein it is combined with the customary field- and line-synchronizing and blanking pulses from synchronizing-signal generator 20. Mixer 13 develops a composite video signal which is applied to direct current inserter 14 wherein it is adjusted as to proper background level. The adjusted video signal is then amplitude modulated on a picture carrier in unit 15, and the modulated video carrier is supplied through diplexer 16 to antenna 17 for transmission to subscriber receivers. Sweep systems 21 and 22 are synchronized by the field- and line-drive pulses from generator 20 in conventional manner.

The audio information accompanying the video information is picked up by microphone 24 and supplied through audio coder 26 to unit 27 wherein it is frequency modulated on a sound carrier. This modulated carrier is then applied through diplexer 16 to antenna 17 from which it is concurrently radiated with the modulated video carrier.

Coding of the video portion of the telecast is achieved by coder 12 under the influence of a deflection-control signal developed by counting mechanism 30 for switching the beam of the beam-deflection tube in coder 12 back and forth between its two collector anodes in accordance with the code schedule represented by the amplitude variations of the control signal. This actuation of encoding device 12 varies the operating mode of the transmitter by modifying the time relation between the video and synchronizing components of the radiated signal and provides effective picture scrambling or coding. The deflection-control signal for coder 12 is developed from line-drive pulses applied by generator 20 to control mechanism 30 wherein they are divided at a 20:1 ratio to produce a square-wave signal having amplitude excursions occurring after every 10 successive line-trace intervals. The square wave, as applied to coder 12, therefore effects mode changes every 10 line traces. In order to interrupt this periodic mode-changing pattern and increase the complexity of the coding schedule, a combination of code signal bursts of up to six different frequencies is developed in source 32 during the mode-determining portion of each field-retrace interval. After being subjected to a transposing or altering operation by means of switching mechanism 33, these bursts are effectively applied to the various input circuits of counting mechanism 30, specifically the input circuits of the two multivibrators thereof, in order to actuate the mechanism to different ones of its operating steps or conditions in the manner disclosed in complete detail in copending application Serial No. 479,170—Roschke.

The combinations of code bursts, without alteration or transposition, are preferably transmitted to subscriber receivers along with the composite video signal as a modulation component. This is expedient inasmuch as the unaltered combinations themselves do not reveal the manner in which the counting mechanism is re-phased during field retrace in response to the altered or transposed combination of code bursts. In the illustrated embodiment, the unaltered code bursts are applied to mixer 13 from source 32 wherein they are added to the video signal during the field-retrace intervals in the manner described in the aforementioned copending Roschke application, Serial No. 479,170.

Figure 2:
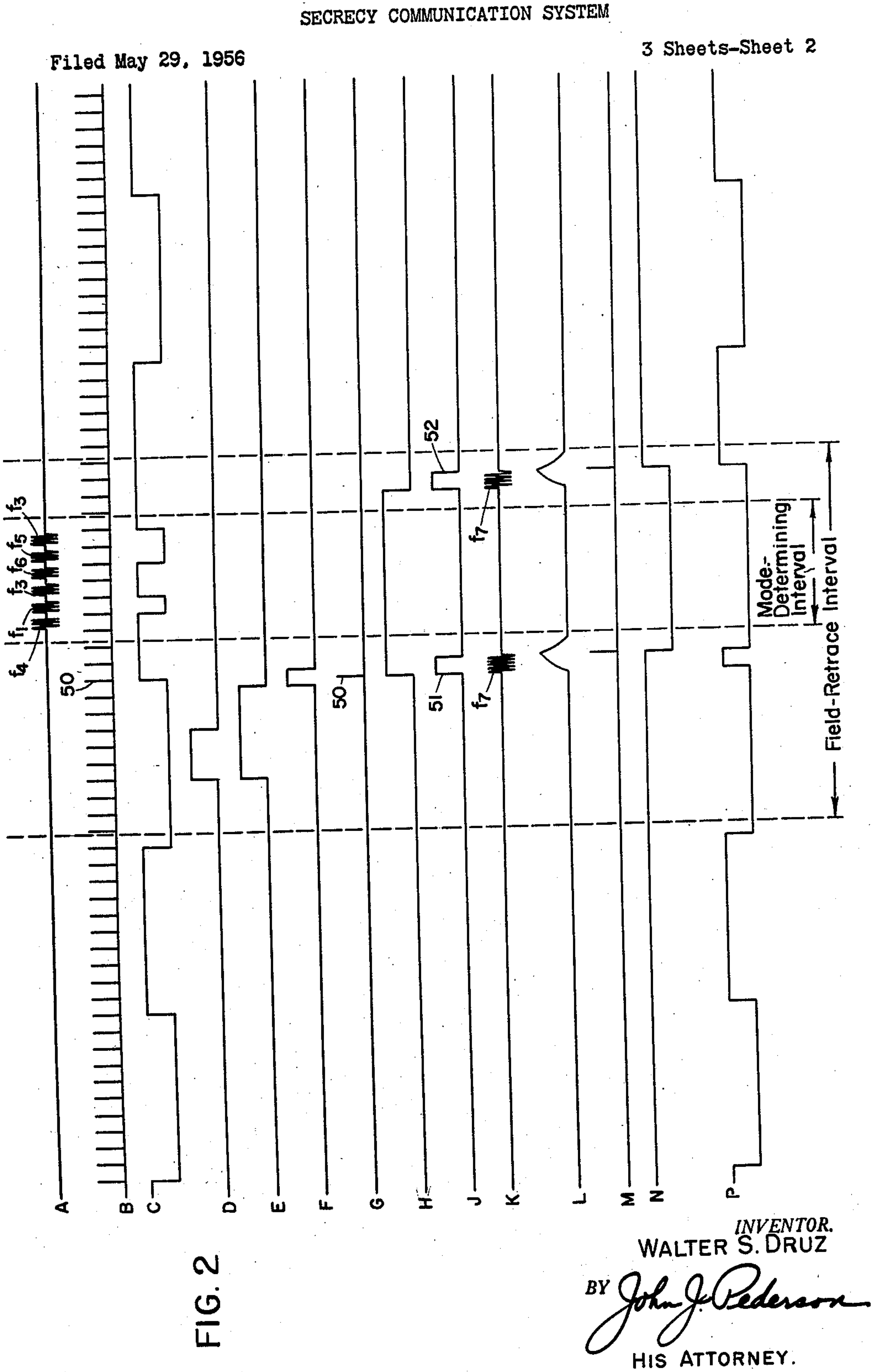
Figure 2 illustrates a family of wave forms which appear at various points in the transmitter of Figure 1.

In considering the operation of the audio coding section of the transmitter in accordance with the invention, attention is directed to Figure 2 which illustrates various idealized signal wave forms which appear at certain points in the transmitter as indicated by encircled reference letters correspondingly identified by the same letter designations in Figure 2. Assume for the moment that the typical combination of code signal bursts as shown in curve A is developed in source 32 for application through transposition mechanism 33 to the various input circuits of the two multivibrators in counting mechanism 30. There are six bursts in all, and each one may exhibit any one of six different frequences $f_1$–$f_6$. Meanwhile, the line-drive pulses of curve B are applied to counting mechanism 30, and the conjoint effect of the two applied signals may produce the typical signal as shown in curve C at the output of counter 30, in a manner which is described in detail in the aforementioned Roschke application, Serial No. 479,170. It will be noted that the control signal of curve C is generally a square wave with amplitude variations every 10 line-trace intervals with the exception of the mode-determining interval embracing the code signal bursts of curve A. During that interval, curve C undergoes additional, random variations such that at the termination of the combination of curve A, counting mechanism 30 may find itself in any one of its twenty operating conditions or operating steps, from which it commences or resumes cyclic actuation under the sole control of the applied line-drive pulses of curve B. The control signal of curve C may be employed for both audio and video coding but, as mentioned before, if this is done, the timing of the additional variations may be detected from the coded audio signal and employed to decode both audio and video intelligence at unauthorized or non-subscriber receiving stations. Even though such unauthorized decoding requires the use of complex and expensive auxiliary equipment, it may be desirable to further increase the security of the system by foreclosing even the possibility.

Consequently, mono-stable multivibrator 37 is actuated in response to field-drive pulses, such as the one shown in curve D, in order to produce an elongated pulse, such as that shown in curve E, for each such field-drive pulse. As disclosed in the previous Roschke application, Serial No. 479,170, the coding bursts of curve A occur between the line-drive pulses superimposed on the vertical blanking pulse during the interval following the second series of equalizing pulses. The circuit parameters of multivibrator 37 are so selected and adjusted that once it is triggered to its abnormal operating condition it remains there until approximately ½ line-trace interval immediately preceding line-drive pulse 50 in curve B, which occurs approximately three full line traces before the occurrence of the first burst in the combination of curve A; at that time it automatically returns to its normal operating state. Monostable multivibrator 38 responds to the trailing edge of the pulse of curve E to produce the pulse of curve F which is applied as a gating signal to normally-closed gate circuit 39. Multivibrator 38 is designed to produce a pulse having a duration approximately equal to one complete line-trace interval. Gate circuit 39 also receives the line-drive pulses of curve B from generator 20, and the gating signal of curve F opens the gate during the occurrence of line-drive pulse 50 in order to produce that pulse in its output as shown by curve G.

The line-drive pulse of curve G is applied to multivibrator 41 to produce the output pulse of curve H which has a duration embracing the entire combination of code bursts of curve A. The pulse of curve G is also supplied to multivibrator 40 along with the output pulse (curve H) of multivibrator 41 in order to develop the two pulses shown in curve J. Multivibrator 40 is triggered in response to line-drive pulse 50 and again in response to the trailing edge of the pulse of curve H in order to produce pulses 51 and 52 which each have a duration of approximately one complete line-trace interval due to the parameters of the multivibrator. The pulses of curve H are then supplied to start-stop burst generator 43 to actuate the generator for the duration of each applied pulse in order to develop the $f_7$ signal bursts as shown in curve K. These bursts are applied to mixer amplifier 13 wherein they are combined with the video signal for transmission to subscriber receivers along with the code burst of curve A.

The bursts of curve K are also applied to rectifier 44 wherein they are rectified to produce the pulses of curve L for application to normally-closed gate circuit 45 to serve as gating signals therefor. The line-drive pulses of curve B are also applied to gate circuit 45, and those that occur in time coincidence with the pulses of curve L are gated in for application to bi-stable multivibrator 47. The gated-in pulses are shown in curve M and they actuate multivibrator 47 as between its two operating conditions to produce the output pulse of curve N for application to normally-open gate circuit 35 to serve as a gating signal therefor. Field-drive pulses like the one shown in curve D are applied to multivibrator 47 to insure that it is placed in its reference operating condition before the application of the first pulse of curve M. In this way the gating pulse of curve N always has a negative polarity.

From a comparison of the pulse of curve N with the random amplitude variations of the control signal of curve C occurring during the mode-determining interval it will be noted that the random variations are gated out or removed from the control signal when gate 35 is closed by pulse N. Thus, the modified control signal shown in curve P is developed in the output of gate 35 for application to audio coder 26, and by comparing this modified control signal with the signal of curve C it will be seen that all of the "telltale" amplitude changes have been eliminated; thus there are no phase inversions of the audio signal during the mode-determining interval.

By way of summary, the transmitter of Figure 1 comprises a control mechanism 30 having a plurality of operating conditions; specifically, it has twenty operating conditions since it executes twenty operating steps in completing each cycle of operation. Synchronizing-signal generator 20 constitutes means for cyclically actuating the control mechanism between its operating conditions to develop a control signal having a characteristic, namely amplitude, that varies periodically in accordance with a predetermined mode-changing pattern. Coding signal source 32 and transposition mechanism 33 may be considered means for disrupting the cyclic actuation of control mechanism 30 during spaced mode-determining intervals (occurring within the field-retrace intervals), thereby introducing during each mode-determining interval additional variations of the characteristic indicative of at least a portion of the code pattern. Microphone 24 and audio amplifier 25 develop an audio intelligence signal. Audio coder 26 constitutes encoding means coupled to control mechanism 30 and to the intelligence-signal-developing means 24, 25 for utilizing the control signal developed at the output of mechanism 30 to effectively encode the intelligence signal. Multivibrators 37, 38, 40, 41 and 47, gate circuits 35, 39 and 45, burst generator 43 and rectifier 44 collectively constitute means coupled to encoding means 26 for preventing encoding of the audio intelligence signal during the spaced mode-determining intervals, thereby restricting encoding to the intervening time intervals only.

Figure 3:
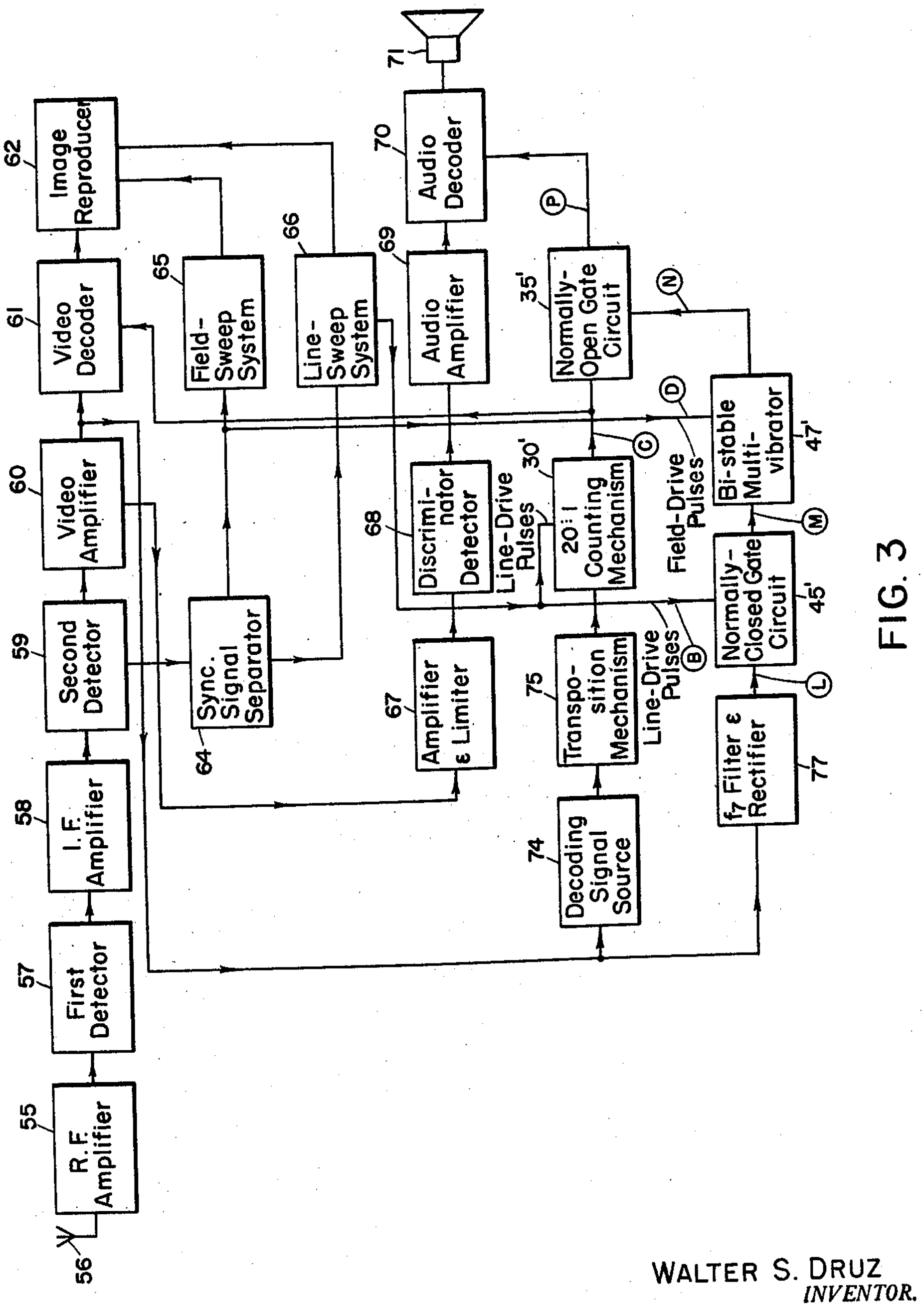
Figure 3 is a schematic representation of a subscription television receiver constructed in accordance with the invention for operation in conjunction with the transmitter of Figure 1.

The receiver of Figure 3 is constructed in accordance with the invention to decode especially the coded television signal from the transmitter of Figure 1. It comprises a radio-frequency amplifier 55 which has input terminals connected to an antenna 56 and output terminals connected to a first detector 57. Detector 57 is connected to an intermediate-frequency amplifier 58 which, in turn, is connected to a second detector 59 having output terminals connected to a video amplifier 60. Amplifier 60 is connected through a video decoder 61 to the input electrodes of a cathode-ray image-reproducing device 62. Video decoder 61 may be similar to video coder 12 at the transmitter except that it is controlled to operate in a complementary fashion in order to effectively compensate for variations in the timing of the video and synchronizing components of the received television signal. Complementary operation of decoder 61 may be assured, for example, by merely reversing the target or receiving anode connections of the beam-deflection tube in that decoder as compared with the anode connections employed in the coder at the transmitter.

Second detector 59 is also coupled to a synchronizing-signal separator 64 which has output circuits connected to a field-sweep system 65 and to a line-sweep system 66. The output terminals of sweep systems 65 and 66 are connected respectively to field- and line-deflection elements (not shown) associated with reproducing device 62.

Video amplifier 60 is also connected to an amplifier and amplitude limiter 67 which, in turn, is coupled through a discriminator detector or demodulator 68 to an audio amplifier 69. The output circuit of audio amplifier 69 is connected to an audio decoder 70 which may be identical in construction to coder 26 at the transmitter so that when actuated by a corresponding control or encoding signal, it effects compensating phase inversions of the coded audio in time coincidence with phase inversions at the transmitter in order to effectively decode the audio signal. The output circuit of decoder 70 is connected to the input terminals of a speaker 71.

A 20:1 counting mechanism 30' is coupled to line-sweep system 66 to derive line-drive pulses therefrom, and the output terminals of counter 30' are coupled to the deflection elements of video decoder 61. Counting mechanism 30' may be an exact counterpart of control mechanism 30 at the transmitter and may also comprise a 5:1 blocking oscillator and two bi-stable multivibrators, all three connected in cascade. When counter 30' is operated in phase synchronism with counter 30, video decoder 61 effectively decodes the received video signal. Suitable reset circuitry is shown, for example, in the copending Roschke application, Serial No. 479,170, in order to maintain the counting circuits at the various subscriber receivers in step with the counting circuits at the transmitter. A decoding signal source 74, which may comprise a series of six filter-rectifier units, has its input circuit coupled to video amplifier 60 to filter out and rectify the code signal bursts of the six different code frequencies $f_1$–$f_6$ which occur during the mode-determining portions of the field-retrace intervals, and has its output terminals connected through a transposition mechanism 75 to various input circuits of control mechanism 30'.

Transposition mechanism 75 is similar to unit 33 at the transmitter in that the code bursts of each combination are altered or transposed by means of switches before they are applied to the various input circuits of counter 30', as is also shown specifically in copending application Serial No. 479,170—Roschke. The requisite setting of switching mechanism 75 is, of course, made known only to authorized subscribers.

A filter and rectifier unit 77 is also coupled to the output of video amplifier 60 in order to separate the $f_7$ bursts from the video signal. The output of rectifier 77 is connected to a normally-closed gate circuit 45' which is identical to gate circuit 45 in the transmitter. Gate 45' is also coupled to line-sweep system 66 in order to derive line-drive pulses therefrom. The output of gate 45' is connected to a pair of input terminals of a bi-stable multivibrator 47' which has another pair of input terminals coupled to synchronizing-signal separator 64 to derive field-drive pulses. The output of multivibrator 47' is connected to an input circuit of a normally-open gate 35' which couples the output of counting mechanism 30' to the beam-deflection electrodes of audio decoder 70. Units 47' and 35' are, of course, identical in construction and perform the same functions as their counterpart elements 47 and 35 in the transmitter.

In the operation of the described receiver, the coded television signal is intercepted by antenna 56, amplified in radio-frequency amplifier 55 and heterodyned to the selected intermediate frequency of the receiver in first detector 57. The resulting intermediate-frequency signal is amplified in intermediate-frequency amplifier 58 and detected in second detector 59 to produce the coded composite video signal. This latter signal is amplified in video amplifier 60, translated through video decoder 61 and impressed on the input electrodes of image reproducer 62 to control the intensity of the cathode-ray beam of the reproducing device in well known manner. The synchronizing components are separated in separator 64, the field-synchronizing components being utilized to synchronize the operation of sweep system 65 and, therefore, the field scansion of the image reproducer while the line-synchronizing pulses are utilized to synchronize sweep system 66 and, therefore, the line scansion of device 62.

An intercarrier-sound signal is developed in detector 59 and separated from the video in amplifier 60 in accordance with intercarrier sound principles. The intercarrier signal is amplified and amplitude limited in unit 67 detected in demodulator or discriminator detector 68, and amplified in audio amplifier 69 to develop a coded audio signal containing a phase inversion for each amplitude variation of the control signal of curve P. This coded audio is decoded by decoder 70 and applied to speaker 71.

Decoding at the receiver is accomplished in the identical manner explained hereinbefore in connection with the coding operation at the transmitter; accordingly, the wave forms of Figure 2 are illustrative of receiver as well as transmitter operation and corresponding letter designations are assigned to the receiver diagram of Figure 3 where appropriate. Briefly, counting mechanism 30' operates in cyclic fashion in response to line-drive pulses applied from sweep system 66 to produce a square-wave deflection-control signal for video decoder 61. During each mode-determining interval, which occurs during an assigned field-retrace interval, decoding signal source 74 separates a combination of code signal bursts, such as that shown in curve A, from the coded composite video signal, and switching mechanism 75 alters or transposes these bursts for application to the various input circuits of the two bi-stable multivibrators in counting mechanism 30' in order to re-phase it to any one of its twenty operating steps or conditions in synchronism with the corresponding operation at the transmitter. Counter 30' therefore develops the signal shown in curve C for application to video decoder 61 in order to compensate for each mode change in the video signal, namely to introduce a compensating time relationship change between video and sync with each change in the received coded video signal. Hence, the video portion of the received telecast is decoded and reproduced intelligibly.

Meanwhile, filter and rectifier 77 responds to the $f_7$ bursts of curve K, which are present in the video signal during field retrace, to develop the rectified pulses of curve L for application to gate circuit 45'. Gate 45' is therefore opened by these rectified pulses to translate the two line-drive pulses shown in curve M to bi-stable multivibrator 47' in order to produce the gating signal of curve N for application to gate circuit 35'. As in the case of multivibrator 47 at the transmitter, multivibrator 47' is reset to a reference condition in response to each field-drive pulse. Gate circuit 35' therefore closes in response to the pulse of curve N in order to effectively delete or remove the random amplitude variations of the control signal of curve C to produce the signal of curve P for application to audio decoder 70. Decoder 70 is thus actuated each time the received coded audio signal undergoes a phase inversion in order to compensate for those inversions and provide a signal to speaker 71 that is completely unscrambled.

The invention, therefore, provides an improved secrecy communication system shown here in the form of either a subscription television transmitter or receiver wherein a control signal having periodically recurring amplitude variations and also randomly occurring amplitude variations, which reflect the code pattern of the entire control signal, is utilized to actuate either an audio coding device or decoding device, but the actuation of each one of those devices is restricted to the time intervals containing the periodic amplitude variations only.

While particular embodiments of the invention have been shown and described, modifications may be made, and it is intended in the appended claims to cover all such modifications as may fall within the true spirit and scope of the invention.

I claim:

1. A secrecy communication system for translating an intelligence signal selectively in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals, thereby introducing during each of said spaced intervals additional variations of said characteristic indicative of at least a portion of said code pattern; means for developing an intelligence signal; encoding means coupled to said control mechanism and to said intelligence-signal-developing means for utilizing said control signal to effectively encode said intelligence signal; and means coupled to said encoding means for preventing encoding of said intelligence signal during said spaced intervals, thereby restricting encoding to said intervening time intervals only.

2. A secrecy communication system for translating an intelligence signal selectively in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals, thereby introducing during each of said spaced intervals additional variations of said characteristic indicative of at least a portion of said code pattern; means for developing an intelligence signal; an encoding device coupled to said intelligence-signal-developing means for varying the operating mode of said communication system in response to an applied signal to encode said intelligence signal; means coupled to said control mechanism and said encoding device for supplying said control signal to said encoding device to effect actuation thereof; and means coupled to said encoding device for preventing actuation of said encoding device by said control signal during said spaced intervals, thereby restricting actuation of said encoding device to said intervening time intervals only.

3. A secrecy communication system for translating an intelligence signal selectively in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals, thereby introducing during each of said spaced intervals additional variations of said characteristic indicative of at least a portion of said code pattern; means coupled to said control mechanism for removing the additional variations from said control signal; means for developing an intelligence signal; and encoding means coupled to said two last-mentioned means for utilizing said control signal, with the additional variations removed, to effectively encode said intelligence signal.

4. A secrecy communication system for translating an audio signal selectively in a plurality of different operating modes comprising: a counting mechanism having a plurality of operating conditions; a source of a periodic signal; means coupled to said source and said counting mechanism for applying said periodic signal to said counting mechanism to effect cyclic actuation of said mechanism between its aforesaid operating conditions in a predetermined periodic repeating sequence to develop a control signal having an amplitude characteristic that varies periodically in accordance with a predetermined mode-changing pattern; means coupled to said counting mechanism for disrupting the cyclic actuation of said counting mechanism during each of a series of spaced intervals in accordance with a predetermined code pattern to vary the phase of said control signal from one to another of the time intervals intervening said spaced intervals, thereby introducing during each of said spaced intervals additional variations of said amplitude characteristic indicative of at least a portion of said code pattern; means for developing an audio signal; an encoding device coupled to said audio-signal-developing means for varying the operating mode of said communication system in response to an applied signal to encode said audio signal; means coupled to said counting mechanism and said encoding device for supplying said control signal to said encoding device to effect actuation thereof; and means coupled to said encoding device for preventing actuation of said encoding device by said control signal during said spaced intervals, thereby restricting actuation of said encoding device to said intervening time intervals only.

5. A secrecy communication system for translating an audio signal selectively in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals as between several possible phase conditions, thereby introducing during each of said spaced intervals additional variations of said characteristic indicative of at least a portion of said code pattern; means for developing an audio signal; a phase-inverting encoding device coupled to said audio-signal-developing means for varying the operating mode of said communication system in response to an applied signal to encode said audio signal; means including a normally-open gate circuit coupling said control mechanism to said encoding device for supplying said control signal to said encoding device to effect actuation thereof; and means coupled to said gate circuit for closing said gate circuit during said spaced intervals to effectively remove said additional characteristic variations from said control signal and thereby restrict the actuation of said phase-inverting encoding device to said intervening time intervals only.

6. A subscription television system for translating a television signal, including video and audio components, having periodically recurring field-trace intervals and intervening field-retrace intervals, said system comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during said field-retrace intervals in accordance with a predetermined code pattern to vary the phase of said control signal from one to another of the intervening field-trace intervals, thereby introducing during each field-retrace interval additional variations of said characteristic indicative of at least a portion of said code pattern; a video encoding device for encoding said video components in response to an applied signal; means coupled to said control mechanism and said video encoding device for supplying said control signal to said video encoding device to effect actuation thereof; an audio encoding device for encoding said audio components in response to an applied signal; means coupled to said control mechanism and said audio encoding device for supplying said control signal to said audio encoding device to effect actuation thereof; and means coupled to said audio encoding device for preventing actuation of said audio encoding device by said control signal during said field-retrace intervals, thereby restricting actuation of said audio encoding device to said intervening field-trace intervals only.

7. A subscription television system for translating a television signal, including video and audio components, having a series of field-trace intervals and a corresponding series of intervening field-retrace intervals recurring at a predetermined field-scanning frequency and further having intervening line-synchronizing components, said system comprising: a counting mechanism responsive to the application of a predetermined number of input pulses for executing a sequence of operating steps to produce a control signal exhibiting an amplitude characteristic which periodically varies upon the completion of each sequence as between at least two predetermined amplitude levels and at a rate faster than said field-scanning frequency; a pulse signal source for supplying a series of input pulses, individually corresponding to one of said line-synchronizing components, to said counting mechanism to effect cyclic actuation thereof; means coupled to said counting mechanism for disrupting the cyclic actuation of said counting mechanism during said field-retrace intervals in accordance with a predetermined code pattern to vary the phase of said control signal from one to another of the intervening field-trace intervals as between several possible phase conditions, thereby introducing during each field-retrace interval additional, random variations of said amplitude characteristic indicative of at least a portion of said code pattern; a video encoding device for varying the time relationship between said video components and said line-synchronizing components in response to an applied signal to effectively encode said video components; means for supplying said control signal to said video encoding device to effect actuation thereof; a phase inverting audio encoding device for inverting the phase of said audio components in response to an applied signal effectively to encode said audio components; gating means coupled to said counting mechanism for removing the additional, random amplitude variations from said control signal during each of said field-retrace intervals; and means coupling said gating means to said audio encoding device for supplying said control signal, with the random amplitude variations removed, to said audio encoding device to effect actuation thereof during only said field-trace intervals.

8. A secrecy communication transmitter for establishing an uncoded intelligence signal selectively in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals, thereby introducing during each of said spaced intervals additional variations of said characteristic indicative of at least a portion of said code pattern; means for developing an uncoded intelligence signal; coding means coupled to said control mechanism and to said intelligence-signal-developing means for utilizing said control signal to effectively code said intelligence signal; and means coupled to said coding means for preventing coding of said intelligence signal during said spaced intervals, thereby restricting such coding to said intervening time intervals only.

9. A subscription television transmitter for transmitting a television signal, including video and audio components, having periodically recurring field-trace intervals and intervening field-retrace intervals, said transmitter comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during said field-retrace intervals in accordance with a predetermined code pattern to vary the phase of said control signal from one to another of the intervening field-trace intervals, thereby introducing during each field-retrace interval additional, random variations of said characteristic indicative of at least a portion of said code pattern; a video coding device for coding said video components in response to an applied signal; means coupled to said control mechanism and said video coding device for supplying said control signal to said video coding device to effect actuation thereof; and audio coding device for coding said audio components in response to an applied signal; means coupled to said control mechanism and said audio coding device for supplying said control signal to said audio coding device to effect actuation thereof; and means coupled to said audio coding device for preventing actuation of said audio coding device by said control signal during said field-retrace intervals, thereby restricting actuation of said coding device to said field-trace intervals only.

10. A secrecy communication receiver for utilizing a received coded intelligence signal established in a plurality of different operating modes comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during each of a series of spaced intervals in accordance with a predetermined code pattern to vary the phase of said control signal from one to another of the time intervals intervening said spaced intervals, thereby introducing during each of said spaced intervals additional variations of said characteristic indicative of at least a portion of said code pattern; means for developing a coded intelligence signal; decoding means coupled to said control mechanism and to said intelligence-signal-developing means for utilizing said control signal to effectively decode said intelligence signal; and means coupled to said decoding means for preventing decoding of said intelligence signal during said spaced intervals, thereby restricting such decoding to said intervening time intervals only.

11. A subscription television receiver for utilizing a coded television signal, including video and audio components, having periodically recurring field-trace intervals and intervening field-retrace intervals, said receiver comprising: a control mechanism having a plurality of operating conditions; means coupled to said control mechanism for cyclically actuating said control mechanism between its aforesaid operating conditions to develop a control signal having a characteristic that varies periodically in accordance with a predetermined mode-changing pattern; means coupled to said control mechanism for disrupting the cyclic actuation of said control mechanism during said field-retrace intervals in accordance with a predetermined code pattern to vary the phase of said control signal from one to another of the intervening field-trace intervals, thereby introducing during each field-retrace interval additional, random variations of said characteristic indicative of at least a portion of said code pattern; a video decoding device for decoding said video components in response to an applied signal; means coupled to said control mechanism and said video decoding device for supplying said control signal to said video decoding device to effect actuation thereof; an audio decoding device for decoding said audio components in response to an applied signal; means coupled to said control mechanism and said audio decoding device for supplying said control signal to said audio decoding device to effect actuation thereof; and means coupled to said audio decoding device for preventing actuation of said audio decoding device by said control signal during said field-retrace intervals, thereby restricting actuation of said decoding device to said intervening field-trace intervals only.

References Cited in the file of this patent

UNITED STATES PATENTS 2,770,803 Ellet ---------------- Nov. 13, 1956